Sept. 29, 1970

W. W. LEE 3,531,207

DIGITAL SPECTRAL LINE IDENTIFIER

Filed Dec. 20, 1965

INVENTOR.
WALTER W. LEE
BY
Constantine A. Michalos
ATTORNEY

INVENTOR.
WALTER W. LEE
BY
Constantine A. Michalos
ATTORNEY

United States Patent Office 3,531,207
Patented Sept. 29, 1970

3,531,207
DIGITAL SPECTRAL LINE IDENTIFIER
Walter W. Lee, Allendale, N.J., assignor to The Bendix Corporation, a corporation of Delaware
Filed Dec. 20, 1965, Ser. No. 514,982
Int. Cl. G01b 9/02
U.S. Cl. 356—112
7 Claims

ABSTRACT OF THE DISCLOSURE

A device for measuring the wave length of light utilizing an array of paired interference plates having semi reflective surfaces, the two plates of each pair being arranged in a predetermined spaced relation different than the spaced relation of the two plates of the other of said pairs of plates dependent upon the wave length of the light to be measured, each of said pairs of plates including an input plate and an output plate, the input plate being arranged to receive there through the light for measurement and passage through both plates of each pair of plates, and sensing means adjacent the output plate of each of said array of paired plates, said array of paired plates being responsive to the wave length of the light for producing at the output plate of said array of paired plates a predetermined light pattern sensed by said sensing means and having a predetermined relation to a binary number system and jointly dependent on the distance the light traveled between the two plates of each pair of plates and the wave length of the light directed from said light source.

---

This invention relates to an optical means for measuring a light wave length by locating a single isolated spectral line and obtaining the reciprocal of its wave length directly as a binary number, and more particularly to a system utilizing an array of paired interference plates or semi-reflective surfaces wherein each pair of plates is illuminated by a light of a different wave length and wherein each light is passed through the pair of plates to appear on a screen placed at the output end of the plates or to be sensed by a photoconductor and then analyzed by an appropriate computer.

An object of this invention is to provide a highly accurate means of measuring light wave length by locating a single isolated spectral line and obtaining the reciprocal of its wave length directly as a binary number.

Another object of this invention is to provide means of accurately measuring the wave length of a light by utilizing the number of bright rings appearing on a screen produced by passing the light through a pair of semi-reflective surfaces placed at a predetermined distance from each other.

A further object of this invention is to provide a device for measuring the wave length of a light utilizing an etalon, which comprises a pair of half-silvered mirrors separated by a spacer, in combination with a light transmitting means at one end and a light sensing means at the other end and which device is used as a basic means for measuring the wave length of said light.

Still another object of this invention is to provide an improved and reliable system for measuring the wave length of a light for driving a satellite control by passing the light through a separated pair of semi-reflective surfaces at a predetermined wave length distance and receiving the information on a screen or a sensing means placed in the output end of the system and then utilizing this information to drive a computer for guiding a satellite.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 9:
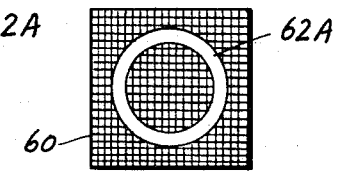
FIG. 9 shows the same pattern of FIG. 8 but of a larger size due to either the additional decrease of the wave length of the light from that of FIG. 8 or the additional increase of distance between the paired plates of that of FIG. 8.
Figure 10:
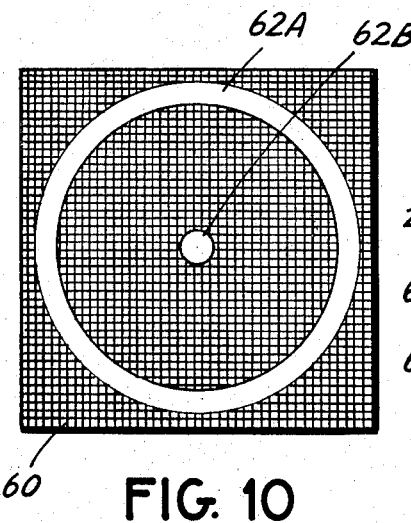
Figure 11:
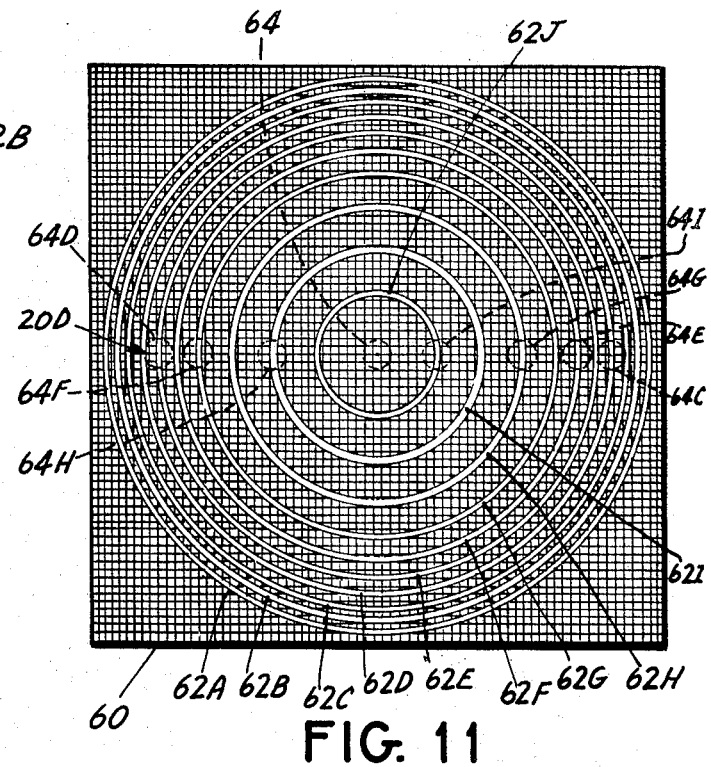

FIG. 10 shows still a different pattern produced by the additional decrease of the wave length or by the additional increase of distance than that shown for FIG. 9; and, FIG. 11 shows still a different pattern produced by a further decrease of the wave length or by the further increase of distance than that shown for FIG. 10, and in addition shows still another method of sensing the spectral lines on the screen.

This invention discloses a device for measuring the location of spectral lines and directly obtaining the reciprocal wave lengths by means of binary numbers. In particular, this device employs a pair or pairs of accurately spaced interference plates or semi-reflective surfaces as means of transmitting therethrough a light for measuring the wave length of this light, by a sensor placed at the output end of the semi-reflective surfaces. The light is passed through one semi-reflective surface and then through the other semi-reflective surface. After traveling the distance between the surfaces, the light appears on a screen placed in the output end of the semi-reflective surfaces.

In addition, this device provides, in essence, electronic means or sensors for detecting the spectral lines by mans of photocells and by means of Schmitt triggers for squaring off the waves received from the photocells through the interference plates, and then directing them through a computer for controlling a system, such as a satellite guiding apparatus.

Figure 5:
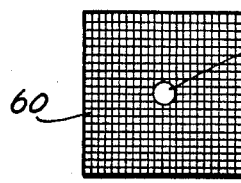
FIG. 5 shows the pattern produced when a single ray of light having a wave length of λ is directed on the screen of FIG. 4 after it had passed through a pair of plates of the type shown by FIGS. 1 and 2.
Figure 6:
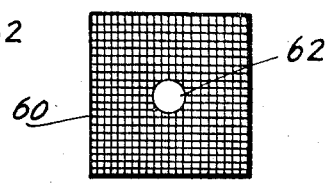
FIG. 6 shows the same pattern of FIG. 5 but of a larger size due to either the decrease of the wave length of the light shown in FIG. 1 or the increase of the distance between the paired plates of FIG. 2.
Figure 7:
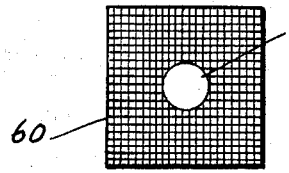
FIG. 7 shows the same pattern of FIG. 6 but of a still larger size due to either the additional decrease of wave length of the light shown in FIG. 1 or the additional increase of the distance between paired plates of FIG. 2.
Figure 8:
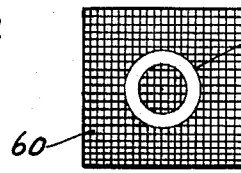
FIG. 8 shows a change in the pattern of FIG. 7 due to a further decrease of the wave length of the light from that of FIG. 7 or the further increase of the distance between the paired plates from that of FIG. 7.

This invention includes an incident light source passing light waves through two semi-reflective surfaces spaced from each other at a predetermined distance such that illumination takes place depending on the wave length of the light and the distance between the semi-reflective surfaces. That is, if a pair of semi-reflective surfaces is illuminated by a light of a wave length λ, there will appear at least one bright spot on a screen placed opposite to the output end of the surfaces, as shown by FIG. 5. As the wave length or λ decreases, the original bright spot will expand, as shown by FIGS. 6 and 7, until a point is reached when it turns into an annulus, as shown by FIG. 8. As the wave length continues to decrease, the annulus continues to expand, as shown by FIG. 9, until a second bright spot will appear at the center of the receiving screen, as shown by FIG. 10. Further, as the wave length λ again decreases, this bright spot becomes an annulus which again expands and then a third bright spot will eventually appear. This process will continue to show on the receiving screen, a design or pattern of spectral lines as more specifically shown in FIG. 11.

This result is utilized in this invention to measure the wave length of light. In addition, this device can be used to measure the wave length of light directed from the interference filter of the interferometric shaft encoder described and claimed in a now abandoned U.S. application Ser. No. 344,881 filed on Feb. 14, 1964, by Walter W. Lee and assigned to The Bendix Corporation, assignee of the present application.

The same patterns shown in FIGS. 5 to 11 will result if the wave length λ remains the same and the distance between the interference plates is changed.

It should be understood that for any value of a wave length λ there are a number of bright rings, spectral lines or fringes. The number of bright rings is given by the formula $M = 2D/\lambda$ where D is the spacing between the two semi-reflective surfaces and λ is the value of the wave lenght.

Figure 2:
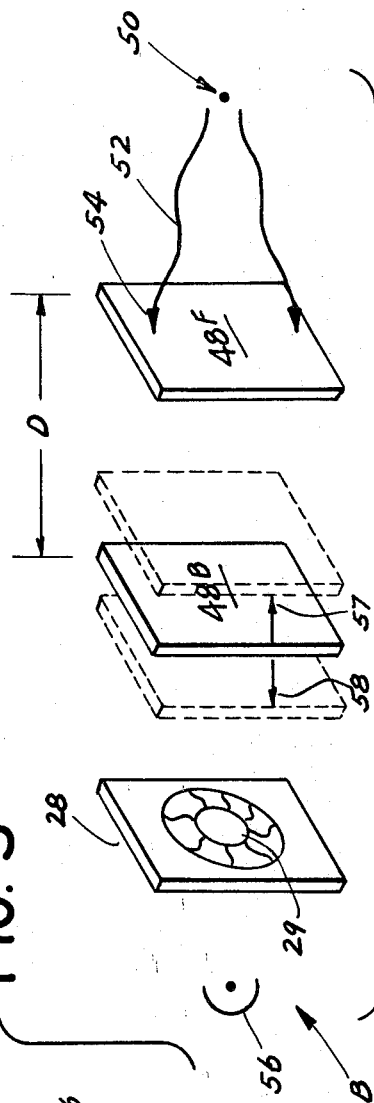
FIG. 2 shows schematically a detailed fragmentary portion of the identifier system in accordance with another embodiment of the invention, illustrating an individual pair of adjustably spaced plates utilized in accurately measuring the light wave length.

Thus, if a light of a constant wave length is allowed to fall on a pair of interference plates, the location and number of bright rings projected on a receiving screen will depend on the distance D, as shown for example by FIG. 2, between the two plates. If the distance D is changed, the location and number of these bright rings will be changed.

Figure 1:
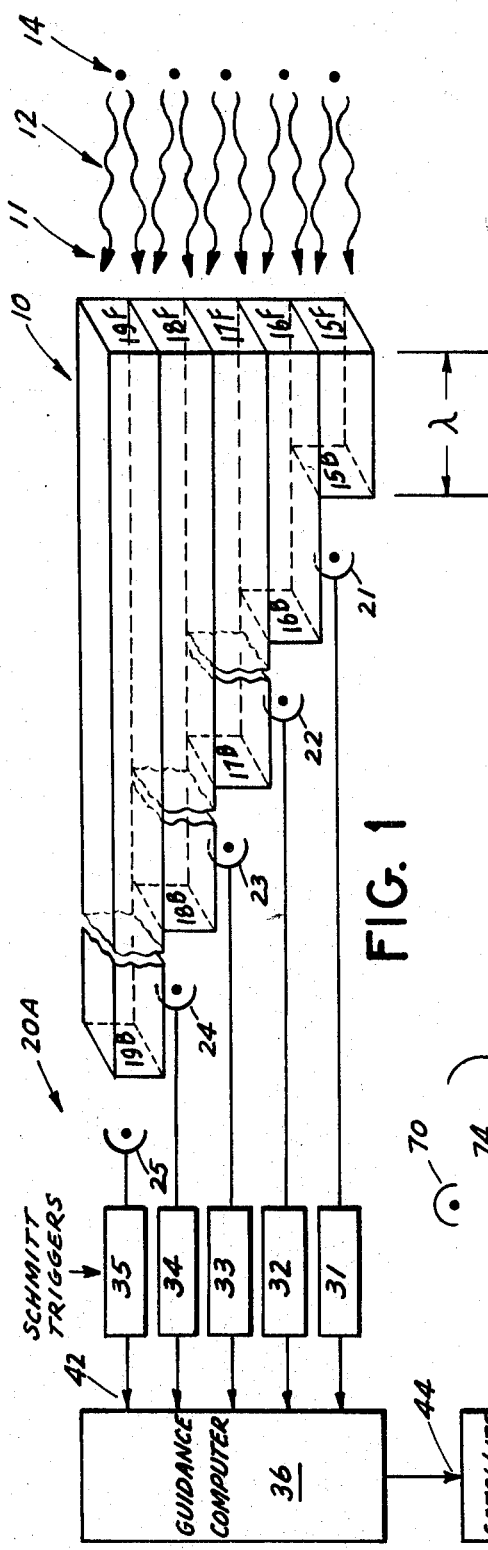
FIG. 1 shows schematically the digital spectral line identifier system utilizing an array of paired differently spaced semi-reflective plates for measuring light waves of different lengths in accordance with a preferred embodiment of the invention.

More specifically, referring to FIG. 1 of the drawing, this invention utilizes an array of paired differently spaced semi-reflective surfaces or interference plates 10 receiving light waves 12 directed from a light source 14 which may be the light source emitting from the interference filter of the hereinbefore mentioned now abandoned U.S. application Ser. No. 344,881. The light source 14 transmits the light waves 12 as shown by arrows 11 to the array of paired interference plates 10 which is utilized for determining the wave length of the transmitted light waves 12.

This system may be typically a wave length analyzer, mentioned in the now abandoned U.S. application Ser. No. 344,881, for measuring the wave lengths of light of a spectrum and thereby provide spectral lines or fringes which are related to the binary number system. These fringes can be sensed by a sensor and computed to describe the angular position of the star tracker. That is, th light source 14 may be mounted on a rotating shaft of the star tracker of the now abandoned U.S. application Ser. No. 344,881 which shaft is to be accurately measured by this digital spectral line identifier.

Referring to FIG. 1 again, and as brought out before, the light waves 12 are directed, as shown by arrows 11, to the semi-reflective surfaces of the interference plate array 10. The array of interference plates 10 comprise front semi-reflective surfaces or interference plates 15F to 19F, and back semi-reflective surfaces or interference plates 15B to 19B which are placed at different distances to the front plates 15F to 19F. These paired semi-reflective surfaces are operably used to determine the wave length of the light waves 12 of the light source 14 as hereinafter more fully described.

Figure 3:
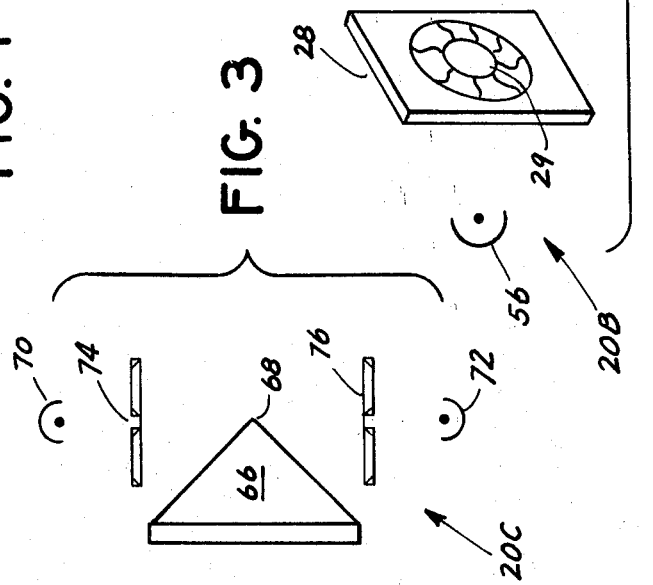
FIG. 3 shows schematically a fragmentary portion of the identifier system in accordance with an additional method of reading the spectral lines presented by the paired plates.

In addition, this system provides a sensing means designated by the numeral 20A shown in FIG. 1, 20B shown partially in FIG. 2, 20C shown partially in FIG. 3 or 20D shown partially in FIG. 11.

The sensor 20A of FIG. 1 comprises a plurality of photocells 21 to 25 each having aperture stops, similar to stop 28 shown in FIG. 2, with a plurality of Schmitt triggers 31 to 35 respectively. The Schmitt triggers 31 to 35 are connected to a guidance computer 36 as shown by arrows 42 to analyze the sensed signal from the array of interference plates 10 through the photocells 21 to 25 and through the Schmitt triggers 31 to 35. The computer 36 analyzes the image produced by the light waves 12, which pass through the paired plates 10 and which numbers are related to the binary number system, and then uses the result to direct a signal as shown by arrow 44 to drive a device 46 which can be a means for measuring the rotating shaft of a star tracker or which can be a control to direct the movement of a satellite.

FIG. 2 shows a single pair of interference plates 48F and 48B, similar to the semi-reflective plates or interference plates shown in FIG. 1, that can be regulated and spaced at a predetermined distance D from each other, which for example can be a distance equal to a multiple of a wave length of $\lambda_0$. If a light source 50 directs a light wave 52 to the front plate 48F, as shown by arrow 54, it will travel through the pair of plates 48F and 48B. That is, the light wave will travel a distance equal to a multiple D or a distance of a wave length $\lambda_0$ before it will emerge through the back plate 48B. The light wave 52 in turn will be received by a photocell 56 through the stop 28 of the sensor 20B. The stop 28 has an adjustable aperture 29 which is used to cut down on the field of view and thereby can limit the presence of more than one annulus.

As shown in FIG. 2, the back plate 48B can be moved toward the front plate 48F in the direction as shown by arrow 57 or away from the front plate 48F in the direction as shown by arrow 58 and thus vary the distance D between the two plates 48F and 48B. Since the distance travelled by the light wave 52 between the two plates 48F and 48B is no longer D, the bright rings will be shifted, as hereinbefore explained, to present a different effect to the photocell 56.

FIGS. 4 to 11 show the patterns produced when monochromatic light is directed through a pair of semi-reflective plates. The distance between the plates can be regulated and spaced at variable distances to produce a different number of annulus depending on the spacing. The patterns of FIGS. 4 to 11 are used to determine the wave length of the light which is directed through the semi-reflective plates.

When the stops 28 are used, only the central portion of the pattern will pass from the array of interference plates 10 to the photocells 21 to 25. The photocells 21 to 25 will sense only an "off" or "on" signal depending if there is or there is not a bright spot at the central portion of the back plates 15B to 19B.

Figure 4:
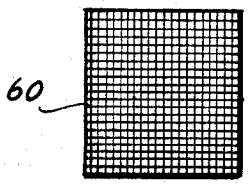
FIG. 4 shows a receiving screen that can be located at the output of the system for measuring the light wave lengths.

More specifically in the operation of the system, if a screen 60, shown in FIG. 4 is placed at the output end of the system at the location of the photocell 56 shown in FIG. 2, and the stop 28 is removed, then when the distance D between the plates 48F and 48B is increased there will be an increase in the number of rings, as shown, from FIG. 4 to FIG. 11. That is if the screen 60, as shown in FIG. 4, is illuminated by the light of a wave length λ, one bright spot 62, as shown on the screen of FIGS. 5 to 7, will gradually appear. As the distance D between the plates 48F and 48B increases, the bright spot 62 will form into an annulus 62A as shown in FIG. 8. As the distance between the plates continues to increase, while the wave length λ of the light remains the same, the annulus 62A will increase in diameter as shown in the FIGS. 9 and 10. Eventually a new bright spot 62B will form as shown in FIG. 10. It should be noted that in the total excursion of λ there are a number of these bright rings 62A to 62J that are formed, as shown in FIG. 11. The number of bright rings is given by the formula $M=2D/\lambda$ where M is the order number of the bright rings; D is the spacing between the semi-reflecting surfaces; and, λ is the wave length of the light transmitted therethrough.

It should be understood that, if the pair of surfaces is illuminated by the light of a wave length λ, a bright spot 62 will appear on the screen 60, as shown in FIG. 5 and as the wave length or λ continues to decrease, the bright spot 62 will increase as shown on the screen of FIGS. 6 and 7. Therefore, as shown in FIG. 1, if the wave length ranges from $\lambda_0$ to $2\lambda_0$ and the number of pairs of surfaces are constructed such that the smallest pair of spaced surfaces 15F and 15B has a separation equal to a multiple of the wave length $\lambda_0$ of the light and each successive pair has a separation of twice the pair preceding, then when λ equals $2\lambda_0$ there will be one bright ring from the smallest spaced pair of interference plates 15F and 15B, two rings on the next pair of plates 16F and 16B, four bright rings on the next pair of plates 17F and 17B, etc. In the embodiment of FIG. 1, at the output of the array of plates 10, there can be placed a series of aperture stops similar to the stop 28, shown in FIG. 2. The stops may be adjusted to have apertures of varying sizes, so that the stop behind the surfaces with the smallest spacing will permit the annulus to remain visible for one half the total excursion of λ. The next smallest pair of surfaces has an appropriate image forming system and a stop with an aperture whose diameter is such that the annulus remains visible for one-fourth of the total excursion of λ. Behind each of these stops there is placed the photocells 21 to 25. The output of the photocells will then be a binary number which describes wherein the octave of $\lambda_0$ to $2\lambda_0$ the wave length of the incident light occurs. This binary number is then squared by the Schmitt triggers 31 to 35 and this information is directed to the guidance computer 36 which in turn is directed to the device 46 which may be used for measuring the rotating shaft of a star tracker or may be used to control a satellite.

It should be also understood that other configurations are evidently possible to measure the spectral line or fringes shown in FIGS. 4 to 11. There can be the sensor 20D, partially shown in FIG. 11, which comprises an array of photodetectors or photocells 64 arranged along a radius of the circular pattern of FIG. 11 and with these photocells 64 spaced in such a way as to detect the total number of rings. It can be also understood that each point across the design shown in FIG. 11 can give rise to its own set of interference fringes depending on the light or darkness of the rings. The condition of this variation of light depending on the wave lengths of the light and the distance of the semi-reflective surface, to thereby determine and analyze the incident light source 14 of FIG. 1 or the light source 50 of FIG. 2 by the system herein described in the two embodiments and in turn direct the control of the satellite in its flight through space.

FIG. 3 of the drawing shows partially the other sensor 20C for reading the spectral lines of the screen 60 of FIGS. 4 to 11. There is shown a prism 66 having an apex 68 receiving the spectral lines from the screen 60 of FIGS. 4 to 11 on receiving the signals directly from the paired plates and dividing the received information into two sections. That is, the prism 66 can reflect the spectral lines on either side to be detected by the sensitive areas of two photocells 70 and 72. Stops 74 and 76 are provided to control the light level. The signal from the two photocells 70 and 72 are then separately analyzed by an appropriate computer, such as the computer 36 of FIG. 1, and applied to a satellite control 46 as hereinbefore more fully described.

It should be understood that the display or image of the spectral lines may be directly picked up from the array of semi-reflective plates of FIG. 1 or from the system shown in FIG. 2. The display will swing from side to side of zero as the spectral lines pass from one side to the other of the apex 68 of the prism 66. Therefore, it should be understood that by using two stops and photocells behind each pair of surfaces, an optical V-scan can be obtained wherein the value of each digit determines which photocell shall be read to obtain the value of the next more significant digit. Thus, the fabrication accuracy required is significantly reduced. Alternately, an optical gray code may be utilized.

In summary therefore, it should be noted that the basic technique of determining the wavelength λ through the digital spectral line identifier of this invention provides for a system that can control a guided missile by use of a novel means of interferometry. It can be easily understood that each pair of semi-reflective surfaces can give rise to its own set of interference fringes depending on the wavelengths of the light source and the distances between the reflective surfaces. The fringes following the mathematical relations of the binary number system may be detected by the sensor which uses the result to direct the satellite control.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. For use with a light source emitting light having a wavelength to be measured; an optical means comprising an array of paired parallel spaced semi-reflective plates having an input plate adjacent said light source and an output plate, the two plates of each pair of plates being arranged in a predetermined spaced relation to each other a distance different than the spaced relation of the two plates of the other of said pairs of plates, the predetermined spaced relation between the plates of each of said pairs of plates being dependent on the wavelength of the light to be measured, said input plate of each of said pairs of plates receiving therethrough the light for measurement and the light passing through both plates of each pair of plates, light sensing means adjacent the output plate of each of said array of paired plates, said array of paired plates being arranged in parallel relation and responsive to the wavelength of the light for producing at an output of the output plate of said array of paired plates a predetermined light pattern, light stop means between the output and the sensing means to render said sensing means effective to sense said predetermined light pattern at the output of said output plate, and said light pattern having a predetermined relation to a binary number system and jointly dependent on the distance the light traveled between the two plates of each pair of plates and the wavelength of the light directed from said light source.

2. The combination defined by claim 1 including a first pair of said array of paired plates spaced a predetermined distance apart related to the wavelength of the light to be measured, and each succeeding pair of said array of paired plates being spaced a distance twice the distance of the preceding pair of plates so as to effect at the output of said array of paired plates a pattern having an image of a plurality of annulus bearing said predetermined relation to said binary number system.

3. The combination defined by claim 1 in which said sensing means includes a plurality of photocells, one of said photocells being located at the output of the output plate of each pair of plates, said photocells being rendered effective by said light stop means so as to be responsive to the predetermined light pattern at the output of said array of paired plates, and means operable by said photocells for effecting a control function.

4. The combination defined by claim 1 including a first pair of said array of paired plates spaced a predetermined distance apart corresponding to the wave length of the light to be measured and each succeeding pair of said array of paired plates being spaced a distance twice the distance of the preceding pair of plates so as to effect an output providing an annulus image bearing said predetermined relation to said binary number system and wherein said sensing means includes a plurality of photocells, said photocells being located at the outputs of the output plates of said pairs of plates and rendered effective by the light stop means for analyzing the annulus image at the output of the output plates of said array of paired plates, and means operable by the photocells and responsive to the light for effecting a control function.

5. The combination defined by claim 1 in which said sensing means comprises a plurality of photocells located at outputs of the output plates of said pairs of plates and rendered effective by the light stop means so as to be responsive to the light patterns therefrom, and a Schmitt trigger connected to each photocell and rendered effective by said photocell depending on the wave length of the light producing said light pattern.

6. The combination defined by claim 1 in which said sensing means includes a plurality of photocells optically connected with said semi-reflective output plates, and operatively controlled by said light stop means, a plurality of Schmitt triggers, each of said Schmitt triggers being connected to a photocell and rendered effective thereby, and a computer connected to said Schmitt triggers for control thereby in accordance with said predetermined relation of the sensed light pattern to said binary number system.

7. For use with a light source emitting light having a wave length to be measured; an optical means comprising an array of paired parallel spaced semi-reflective plates having an input plate adjacent said light source and an output plate, the two plates of each pair of plates being arranged in a predetermined spaced relation to each other a distance different than the spaced relation of the two plates of the other of said pairs of plates, the predetermined spaced relation between the plates of each of said pairs of plates being dependent on the wave length of the light to be measured, said input plate of each of said pairs of plates receiving therethrough the light for measurement and the light passing through both plates of each pair of plates, light sensing means at the output plate of each of said array of paired plates, said array of paired plates being arranged in parallel relation and responsive to the wave length of the light for producing at outputs of the output plates of said array of paired plates predetermined light patterns of a plurality of annulus images, said light patterns having a predetermined relation to a binary number system, said semi-reflective plates being interference plates optically spaced for measuring the light wave length by locating signal isolated spectral lines and obtaining the reciprocal wave length to effect the light patterns at the outputs related to said binary number system, said light sensing means being so arranged at the outputs of said pairs of plates as to selectively sense annulus images effected by the light transmitted through said array of paired plates, trigger means connected to said light sensing means and responsive to information conveyed by said light sensing means in sensing said annulus images, and computer means connected to said trigger means for receiving said information related to said binary number system to effect a control function.

References Cited
UNITED STATES PATENTS 3,045,535    6/1962    Jacquinot et al.    88—14
3,377,912    4/1968    Yates    88—14

RONALD L. WIBERT, Primary Examiner